United States Patent
Roberts

(10) Patent No.: US 9,626,821 B2
(45) Date of Patent: Apr. 18, 2017

(54) ELECTRONIC PAYMENT SYSTEM

(75) Inventor: John Richard Roberts, Beaverton, OR (US)

(73) Assignee: QUALCOMM Incorporated, San Diego, CA (US)

( * ) Notice: Subject to any disclaimer, the term of this patent is extended or adjusted under 35 U.S.C. 154(b) by 1253 days.

(21) Appl. No.: 12/108,717

(22) Filed: Apr. 24, 2008

(65) Prior Publication Data

US 2009/0271276 A1   Oct. 29, 2009

(51) Int. Cl.
| | |
|---|---|
| *G06Q 20/00* | (2012.01) |
| *G06G 1/12* | (2006.01) |
| *G06Q 40/00* | (2012.01) |
| *G07F 7/10* | (2006.01) |
| *G06Q 20/20* | (2012.01) |
| *G06Q 20/32* | (2012.01) |
| *G06Q 20/34* | (2012.01) |
| *G07F 7/08* | (2006.01) |

(52) U.S. Cl.
CPC .......... *G07F 7/1008* (2013.01); *G06Q 20/20* (2013.01); *G06Q 20/32* (2013.01); *G06Q 20/3278* (2013.01); *G06Q 20/341* (2013.01); *G07F 7/0886* (2013.01)

(58) Field of Classification Search
CPC .......... G06Q 20/00; G06Q 20/38; H04K 1/00
USPC .................. 705/16, 1.1, 21, 41, 71; 380/270
See application file for complete search history.

(56) References Cited

U.S. PATENT DOCUMENTS

| | | | |
|---|---|---|---|
| 6,279,825 B1 | 8/2001 | Yokoyama | |
| 6,687,825 B1 * | 2/2004 | Challener et al. ............ 713/176 |
| 7,128,274 B2 | 10/2006 | Kelley et al. | |
| 7,562,813 B2 * | 7/2009 | Humphrey et al. .......... 235/379 |
| 7,597,250 B2 * | 10/2009 | Finn ............................... 235/380 |
| 7,647,024 B2 * | 1/2010 | Wang et al. ................. 455/41.2 |
| 7,664,699 B1 * | 2/2010 | Powell ............................ 705/39 |
| 7,708,194 B2 * | 5/2010 | Vawter .......................... 235/380 |
| 2002/0049677 A1 * | 4/2002 | Yamada et al. ................ 705/51 |
| 2004/0162981 A1 * | 8/2004 | Wong ............................ 713/161 |

(Continued)

FOREIGN PATENT DOCUMENTS

| | | |
|---|---|---|
| CN | 1908981 A | 2/2007 |
| CN | 101369365 A | 2/2009 |

(Continued)

OTHER PUBLICATIONS

International Search Report and Written Opinion—PCT/US2009/040179, International Search Authority—European Patent Office—Jul. 6, 2009.

*Primary Examiner* — Seye Iwarere

(74) *Attorney, Agent, or Firm* — Joseph Hanasz

(57) ABSTRACT

The specification and drawing figures describe and show a system for making a payment across a point-of-sale device that includes at least one a payment instrument having financial data required to conduct a financial transaction across a credit network. The system also includes a mobile wireless instrument having a data processor operatively connectable to the point-of-sale device and to the payment instrument. At least one algorithm is provided for transmitting the financial data from the payment instrument to the data processor of the mobile wireless instrument, and for decrypting an encryption key, as well as transmitting an instruction from the mobile wireless instrument to the point-of-sale device to authorize the payment.

13 Claims, 5 Drawing Sheets

(56) References Cited

U.S. PATENT DOCUMENTS

| | | | |
|---|---|---|---|
| 2004/0204082 A1* | 10/2004 | Abeyta | G06Q 20/04 455/557 |
| 2005/0188219 A1* | 8/2005 | Annic et al. | 713/200 |
| 2005/0234832 A1* | 10/2005 | Kanai | 705/57 |
| 2006/0179079 A1* | 8/2006 | Kolehmainen | 707/104.1 |
| 2006/0255128 A1* | 11/2006 | Johnson | G06Q 20/12 235/380 |
| 2007/0008920 A1* | 1/2007 | Annic | 370/328 |
| 2007/0022058 A1* | 1/2007 | Labrou | G06Q 20/32 705/67 |
| 2007/0123215 A1* | 5/2007 | Wang et al. | 455/411 |
| 2007/0220575 A1* | 9/2007 | Cooper et al. | 725/118 |
| 2007/0255653 A1* | 11/2007 | Tumminaro et al. | 705/39 |
| 2007/0297610 A1* | 12/2007 | Chen | H04L 9/0822 380/270 |
| 2008/0201212 A1* | 8/2008 | Hammad et al. | 705/13 |
| 2008/0208762 A1* | 8/2008 | Arthur et al. | 705/79 |
| 2009/0094123 A1* | 4/2009 | Killian et al. | 705/16 |
| 2009/0098825 A1 | 4/2009 | Huomo et al. | |
| 2009/0112765 A1* | 4/2009 | Skowronek | 705/44 |
| 2009/0144161 A1* | 6/2009 | Fisher | 705/16 |
| 2009/0192935 A1* | 7/2009 | Griffin et al. | 705/41 |
| 2009/0200371 A1* | 8/2009 | Kean et al. | 235/379 |
| 2009/0210308 A1* | 8/2009 | Toomer et al. | 705/16 |
| 2009/0312011 A1* | 12/2009 | Huomo et al. | 455/426.1 |
| 2012/0150601 A1* | 6/2012 | Fisher | G06Q 20/20 705/14.23 |

FOREIGN PATENT DOCUMENTS

| | | |
|---|---|---|
| EP | 1280112 | 1/2003 |
| JP | H11353237 A | 12/1999 |
| JP | 2001512876 A | 8/2001 |
| JP | 2001527258 A | 12/2001 |
| JP | 2002279320 A | 9/2002 |
| JP | 2004199601 A | 7/2004 |
| JP | 2007065973 A | 3/2007 |
| JP | 2009536772 A | 10/2009 |
| JP | 2009541858 A | 11/2009 |
| RU | 2285296 C2 | 10/2006 |
| WO | WO9908238 | 2/1999 |
| WO | 9933191 A1 | 7/1999 |
| WO | WO2006095212 | 9/2006 |
| WO | 2007149775 A2 | 12/2007 |

\* cited by examiner

ELECTRONIC PAYMENT SYSTEM

FIELD OF TECHNOLOGY

The system, apparatus and methods disclosed, illustrated and claimed in this document pertains generally to an electronic payment system. More particularly, the new and useful payment system includes a method of transmitting financial data from a payment instrument to a storage medium of a mobile wireless instrument for making a payment across a point-of-sale device without the need for producing or using the payment instrument itself. The electronic payment system is particularly useful for collecting, storing, decrypting, processing and transmitting NFC-enabled financial data from a payment instrument to a mobile wireless instrument, and subsequently conducting a financial transaction across a credit network using an NFC-enabled point-of-sale device.

BACKGROUND

Use of credit cards, debit cards, and similar payment instruments has become the universally preferred means for consumer purchases of goods and services. At least one current construct for effecting consumer purchases across a financial institution credit network is the limitation of having to use of a single payment instrument in connection with a financial transaction such as a purchase. Presently a consumer must have in the consumer's possession a plastic payment instrument such as a credit card or debit card. The plastic payment instruments may include a magnetic strip or may be "contactless" in nature. In either case, personal financial information of the person to whom or entity to which a payment instrument is issued is embedded in the payment instrument that a point-of-sale device is capable of reading to authorize a financial transaction.

At a point-of-sale, a card reader, terminal, or similar point-of-sale payment device typically is provided, requiring a consumer or user of a payment instrument to successfully "swipe" the payment instrument through the point-of-sale device. In connection with payment instruments having magnetic strips, over time and from repetitive use the magnetic strip on the payment instrument degrades, and the financial data embedded in the magnetic strip may become unreadable due to a variety of causes by a point-of-sale device. Degradation of the magnetic strip may cause payment rejection although the consumer may be the authentic owner of the payment instrument. Authentication or verification of the customer is limited to financial data and information embedded in the magnetic strip of the payment instrument: whoever possesses the payment instrument may affect purchases. The use of personal identification numbers solves the problems neither of customer identification nor customer verification. Customer authentication fails to overcome problems of lost or stolen payment instruments, degraded instruments, or loss of functionality between the payment instrument and point-of-sale payment devices.

In connection with "contactless" payment instruments, the plastic rendition of such a payment instrument generally includes a memory chip and an antenna. Information in the credit card memory chip, referred to in this document as "financial data," may be encoded in such a manner that a mobile wireless instrument, such as a cellular telephone, may decode the financial data for use by the mobile wireless instrument. Generally speaking, the process of decoding financial data may be done with a computational mechanism, an algorithm, and a decryption key used in a decryption algorithm. Radio waves at a current frequency of 13.56 megahertz, sometimes referred to as the "RFID frequency," enables the financial data residing and/or embedded in the memory chip to be readable.

The financial data in the memory chip may be encrypted and, as indicated, require an encryption key to decrypt. Members of the credit card industry, such as EMV (Europay, MasterCard and VISA), distribute one or more decryption keys to selected and authorized parties, typically a point-of-sale device. A mobile wireless instrument may be enabled to read the contents of the embedded memory chips.

Standard ISO 7813 defines the standards for payment instruments. Such information may include the name of the primary account holder, the primary account number, a country code, the expiration date of the payment instrument, and a personal identification number ("PIN"), among other data and information pertaining to a user of the payment instrument. Contactless integrated circuit devices, such as those described in this document, frequently are referred to as "proximity cards" and/or "smartcards." The term "proximity" refers to a present limitation of the near field communications ("NFC") environment in which the contactless and smart payment instruments are generally used: the distance between the point-of-sale device and either the contactless payment instrument or the mobile wireless instrument currently is limited to ten centimeters or less, although newer technologies seek to increase that distance. More modern proximity cards may also be covered by ISO 1443, the proximity card standard, and a related ISO 15693, the vicinity card standard. A "contactless" payment instrument requires no "PIN" or signature, which raises concerns about security: a lost or stolen payment instrument may be used without verification or authentication. As a person skilled in the art will appreciate and understand, NFC technologies communicate over magnetic field induction, where at least two loop antennas are located within each other's "near field," effectively forming an air-core transformer that operates within a globally available and unlicensed radio frequency which, as indicated, is an ISM band of 13.56 MHz, with a band width of almost two MHz.

In the field of cryptography, encryption is the process of transforming information, often referred to as "plaintext", using an encryption algorithm often called a "cipher" to make the result unreadable to anyone except those possessing special knowledge such as an encryption key. The result of the process is encrypted information, often referred to as "ciphertext." Encryption also refers to the reverse process of decryption. As is known to a person skilled in the art, encryption may protect confidentiality of messages, but other techniques are still needed to protect the integrity and authenticity of a message. For example, verification of a message authentication code or a digital signature may be appropriate. Accordingly, there is a need for the verification aspect of the electronic payment system of this document.

While the use of payment instruments has become ubiquitous across credit card networks, confidentiality verification and authentication remain limitations of the current state of the art. Loss or theft of a payment instrument also remains a significant problem. Loss of a mobile wireless instrument, such as a cellular telephone, having the ability to temporarily read and acquire and collect financial data from a payment instrument, is less likely. In addition, using a combination of storage media within a credit system and within a mobile wireless instrument, the problem of permanency of financial data residing on only a mobile wireless instrument may be controlled.

Accordingly, a need exists in the industry for a new and useful electronic payment system that is capable of providing a mobile wireless instrument that may collect, receive, store, process and transmit not only financial data across a credit network, but also do so in connection with encrypted financial data residing on a payment instrument. There is also a need to be able to transmit to one or more storage media, including a data processor of the mobile wireless instrument, financial data from the payment instrument to a point-of-sale device to enable the user of the mobile wireless instrument to conclude a financial transaction using the financial data.

In addition, the well-known credit and/or debit card credit system is anything but paperless. Despite advent of the customer-not-present ("CNP") electronic telephone authorizations, the vast majority of customers conduct financial transactions across a credit network using a single payment instrument in the form of a credit or debit card, signing a receipt or similar paper confirmation of the transaction, or perhaps conduct the transaction via a touch screen, indicating the amount of payment that may be charged against only a single payment instrument. Paper confirmations of the transactions must be collected and collated. The apparatus, system, and methods disclosed, illustrated, and claimed in this document obviate paper receipts, and offer the prospect of instant-payment transactions across a credit network.

SUMMARY

The electronic payment system disclosed, illustrated, and claimed in this document addresses the above-stated needs by providing an apparatus, system and methods for conducting a financial transaction using financial data embedded on a payment instrument that is collected and stored in a mobile wireless instrument, and used to conduct a financial transaction across a credit network. In one aspect, a financial transaction, such as payment for goods or services, may be transacted across an NFC-enabled point-of-sale device. Instead of using a payment instrument, such as an NFC-enabled payment instrument having user financial data embedded in the payment instrument, the user financial data is decrypted, collected, and stored in a mobile wireless instrument, such as a mobile wireless cellular telephone. The mobile wireless instrument includes a data processor capable of receiving and storing the financial data, and is capable of processing and transmitting the financial data across a credit network. Decryption of the financial data embedded in the payment instrument is achieved by use of an encryption key. When a user desires to conduct a financial transaction, such as the purchase of goods or services, the user is not required to have a payment instrument in the user's possession. Rather, the user of the mobile wireless instrument places the mobile wireless instrument in operational proximity to the point-of-sale device, and sends an instruction from the mobile wireless instrument to the point-of-sale device to authorize the financial transaction.

It will become apparent to one skilled in the art that the claimed subject matter as a whole, including the structure of the apparatus, and the cooperation of the elements of the apparatus, combine to result in a number of unexpected advantages and utilities. The structure and co-operation of structure of the electronic payment system, and in one aspect, an NFC-enabled payment system, will become apparent to those skilled in the art when read in conjunction with the following description, drawing figures, and appended claims.

The foregoing has outlined broadly the more important features of the invention to better understand the detailed description that follows, and to better understand the contributions to the art. The electronic payment system is not limited in application to the details of construction, and to the arrangements of the components, provided in the following description or drawing figures, but is capable of other embodiments, and of being practiced and carried out in various ways. The phraseology and terminology employed in this disclosure are for purpose of description, and therefore should not be regarded as limiting. As those skilled in the art will appreciate, the conception on which this disclosure is based readily may be used as a basis for designing other structures, methods, and systems. The claims, therefore, include equivalent constructions. Further, the abstract associated with this disclosure is intended neither to define the electronic payment system, which is measured by the claims, nor intended to limit the scope of the claims. The novel features of the payment system are best understood from the accompanying drawing, considered in connection with the accompanying description of the drawing, in which similar reference characters refer to similar parts, and in which:

Figure 1:
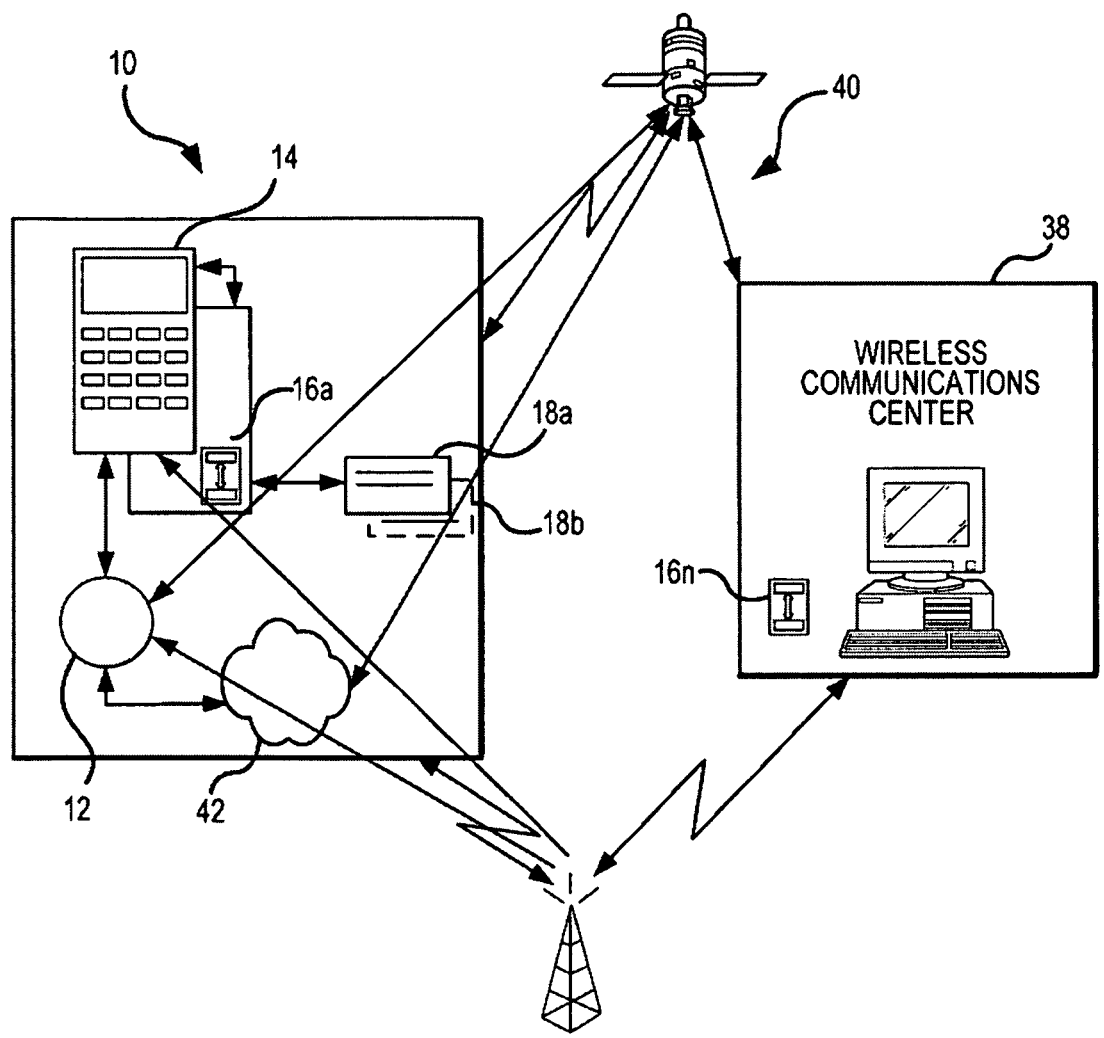
FIG. 1 is a diagrammatic view of the electronic payment system in use across a mobile wireless communications system and credit system.

To the extent that the numerical designations in the drawing figures include lower case letters such as "a,b" such designations include multiple references, and the letter "n" in lower case such as "a-n" is intended to express a number of repetitions of the element designated by that numerical reference and subscripts.

DETAILED DESCRIPTION

Definitions

The term "enabled" as used in this document means to cause to operate in the sense, for example, that software enables a keyboard. In the context of this document, therefore, the term "NFC-enabled" means that the apparatus, device and/or system is caused to operate using near field communication ("NFC") technologies.

The term "transferring," as in the step of transferring financial data from one object to another object, means at least (a) to read, collect and process financial data from an object, such as, for one non-exclusive example, a payment instrument, and (b) to transmit export, and store for reuse the financial data in another object, such as, for another non-exclusive example, a storage medium in a mobile wireless instrument such as, for another non-exclusive example, a cellular telephone or cellphone.

The term "validate" or "validating" means at least to confirm the financial data transmitted to a storage medium of the data processor from a payment instrument, such as confirming expiration dates of a payment instrument, comparing the expiration dates of a payment instrument with the payment date, comparing the identification of the owner of the payment instrument with that of the owner and/or user of the mobile wireless instrument, and similar validation steps.

The terms "mobile wireless communications instrument" and "portable wireless communications instrument" as used in this document means at least a wireless communication instrument used in a wireless communications system that, in general, includes an array of operatively connected communication devices adapted to receive and transmit at least electromagnetic signals across the system without cables using infrared light and radio signals, and also includes a telecommunications system in which electromagnetic waves, rather than some form of wire, carry the signal over all or part of the communication path. The mobile wireless communications instrument may also receive and transmit signals from satellites, including satellites that are part of the Global Positioning System (GPS), Galileo, GLONASS, NAVSTAR, GNSS, a system that uses satellites from a combination of these systems, or any satellite positioning system subsequently developed (collectively referred to generally in this document as a Satellite Positioning System (SPS)). As used in this document, an SPS also includes pseudolite (pseudo-satellite) systems.

The term "instrument" in combination with the words "mobile wireless communications," means and includes at least a cellular phone and a pager, a satellite telephone, a two-way pager, a personal digital assistant ("PDA") having wireless capabilities, a portable computer having wireless capabilities, home entertainment system control boxes, wireless local area networks, and any other type of wireless device having transmission capabilities that may also be one or more versions of a personal communications services device ("PCS") including time division multiple access ("TCMA"), a code division multiple access ("CDMA"), a global system for mobile ("GSM"), non-voice communications apparatus, and text transmission apparatus, among others.

The term "point-of-sale device" means at least a terminal or other device consisting of peer-to-peer near field communications devices and subject at least to standards ISO 14443-compliant contactless card, and ISO 18092-compliant FeliCa cards, among others. Thus, a point-of-sale device includes not only credit card and debit card readers (that may include touch screens), but also automatic and automated teller machines ("ATM's"), among others.

The term "credit network" means a national and/or worldwide system in which financial institutions, merchants, and public users are connectable. Credit networks were designed for use primarily with payment instruments. Payment instruments allow users, or customers, to use, for example, a credit or debit card to purchase goods or services in substantially real time following authentication of the customer, and approval and/or authorization of the transaction by a financial institution. A user, or customer (in this document, "user" or "customer") is issued a payment instrument such as a credit or debit card after an account has been approved by the credit provider, often a financial institution such as a bank, with which the user is able to make purchases from merchants who accept the credit, up to a pre-established limit. In addition, a "card association" often is included in the credit network, and includes among others VISA® and MasterCard® which act as gateways between a financial institution and issuer for authorizing and funding transactions, the issuer being a financial institution or other organization that issued the credit/debit card to the cardholder.

The terms "financial data" and "financial information" mean any and all economic data related to matters of money. Financial data may be personal and/or commercial. Financial data and information is concerned with management of money, banking, credit, investments and assets. Accordingly, the tern financial data includes at least user financial data including, but not limited to, the name of a primary account holder, the primary account number associated with the primary account holder, a country code, an expiration date, and a personal identification number.

The term "financial transaction" means at least the use of financial data and financial information used in conducting a purchase across a credit network using financial data that originates in a payment instrument.

The term "payment instrument" means at least a credit card, a debit card, a "contactless" card, debit lines, debit coupons, and cash equivalents.

Description

As illustrated in FIGS. 1-4, a payment system is provided that in its broadest context transfers financial data required to make a payment across a credit network from a payment instrument to a storage medium of a mobile wireless instrument for making the payment across a point-of-sale device without the need for producing or using the payment instrument itself. As indicated in this document, both the payment instrument and the point-of-sale device may be NFC-enabled. However, NFC-enablement is not a limitation of the apparatus, system, or methods of this document. As a person skilled in the art will appreciate, any future system similar or equivalent to NFC technology may be used to make a payment from a mobile wireless instrument across a credit system.

Thus, the payment system includes a point-of-sale device. Instead of using a payment instrument, such as an NFC-enabled payment instrument having user financial data embedded in the payment instrument, the user financial data is decrypted, collected, and stored in a mobile wireless instrument, such as a mobile wireless cellular telephone. The mobile wireless instrument includes a data processor capable of receiving and storing the financial data, and is capable of processing and transmitting the financial data across a credit network. Decryption of the financial data embedded in the payment instrument is achieved by use of an encryption key. When a user desires to conduct a financial transaction, such as the purchase of goods or services, the user is not required to have a payment instrument in the user's possession. Rather, the user of the mobile wireless instrument places the mobile wireless instrument in operational proximity to the point-of-sale device, and sends an instruction from the mobile wireless instrument to the point-of-sale device to authorize the financial transaction.

More specifically, in at least one aspect of the electronic payment system 10 disclosed, illustrated and claimed in this document, a point-of-sale device 12 is provided. A portable, or mobile, wireless instrument 14 also is provided as illustrated in FIG. 1 schematically and diagrammatically. The mobile wireless instrument is selected from the group of mobile wireless instruments consisting of cellular phones, communication apparatus providing personal communications services ("PCS") including time division multiple access ("TDMA"), code division multiple access ("CDMA") and global system for mobile ("GSM"), non-voice communication apparatus, text transmission apparatus, satellite telephones, two-way pagers, personal digital assistants, portable wireless computers, and a wireless instrument specifically designed to implement financial transactions, among others.

Figure 2:
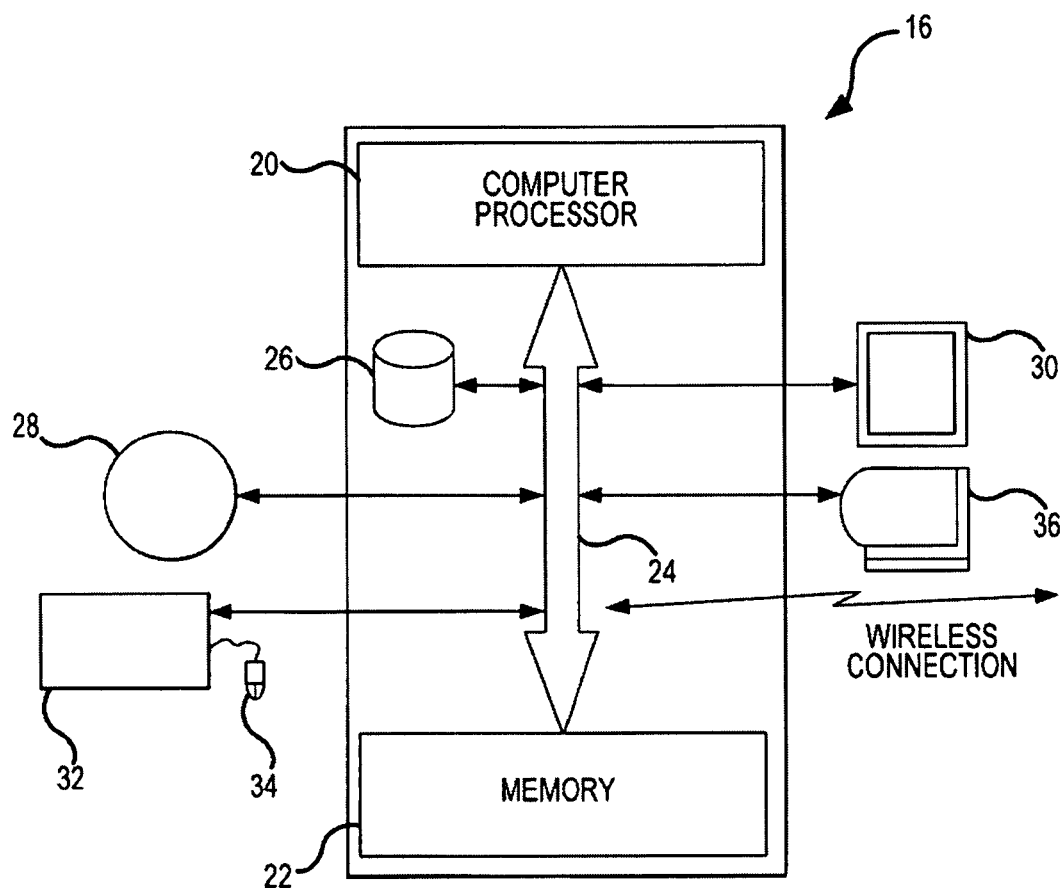
FIG. 2 is a diagrammatic view of a computer processing system of a mobile wireless communications instrument.

As illustrated by cross-reference between FIGS. 1-2, the electronic payment system 10 includes at least one computer processing system 16. As shown, the computer processing system 16 is operatively connected to the mobile wireless communications instrument 14. In one aspect, the computer processing system 16 is housed in the mobile wireless instrument 14. The computer processing system 16 is adapted to transmit and receive financial data in connection with one more payment instruments 18a-b. In operation, any and all data electronically or otherwise embedded in and on the one or more payment instruments 18a-b, as shown in FIG. 1, as well as any other data associated with a customer, a financial institution, and/or a card association, may be stored in the computer processing system 16 of the mobile wireless instrument 14 for use as further described in this document.

The computer processing system 16 of the mobile wireless instrument 14 includes a data processing system as illustrated in a non-exclusive example in the block diagram of FIG. 2. As shown, the data processing system may include a variety of components to enable the mobile wireless instrument 14 to receive, process, store, and transmit data and information to a point-of-sale device 12, including a data processor 20, memory 22, the data processor and memory connected by a bus 24. Memory is a relatively high-speed machine-readable medium and includes volatile memories such as DRAM, and SRAM, as well as non-volatile memories such as ROM, FLASH, EPROM, EEPROM, and bubble memory. Also connectable to the bus 24 are optional secondary storage 26, external storage 28, output devices such as a monitor 30 that may be mounted on the mobile wireless instrument 14, and in optional configurations an input device such as a keyboard 32 with a mouse 34, and perhaps even a printer 36. Secondary storage 26 may include machine-readable media such as a hard disk drive, a magnetic drum, and a bubble memory. External storage 28 may include machine-readable media such as a floppy disk, a removable hard drive, a magnetic tape, CD-ROM, and even other computers connected via a communications line. The distinction between secondary storage 26 and external storage 28 is primarily for convenience in describing the invention. As such, a person skilled in the art will appreciate that there is substantial functional overlap between and among the components. Computer software and user programs can be stored in a software storage medium such as memory 22, secondary storage 26, and external storage 28. Executable versions of computer software can be read from a storage medium such as non-volatile memory, loaded for execution directly into volatile memory, executed directly out of non-volatile memory, or stored on the secondary storage 26 prior to loading into volatile memory for execution.

In addition, those skilled in the art also will appreciate that the various illustrative logical blocks, modules, circuits, and algorithm steps described in connection with aspects of the invention disclosed in this document may be implemented as electronic hardware, computer software, or combination of both. To clearly illustrate this interchangeability of hardware and software, various illustrative and non-exclusive components, blocks, modules, circuits, and steps have been described in this document generally in terms of their functionality. Whether such functionality is implemented as hardware or software depends on the particular application and design constraints imposed on an overall system. Skilled artisans may implement the described functionality in varying ways for each particular application, but such implementation decisions should not be interpreted as causing a departure from the scope of the present invention.

The various illustrative logical blocks, modules, and circuits described in connection with the aspects disclosed in this document may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices such as, in a non-exclusive example, a combination of a DSP and a microprocessor, a plurality of microprocessors, one or more microprocessors in conjunction with a DSP core, or any other such configuration.

The computer processing system 16 of the mobile wireless instrument 14 is capable of communicating with the point-of-sale device 12 due in part to use of a near-field communications system, or similar technology. In operation, a user brings the mobile wireless instrument 14 adjacent the point-of-sale device 12 and, using keys or other means for transmitting signals and information, transmits instructions in connection with the financial data to the point-of-sale device 12 using one or more near-field communications systems. Alternatively, as described in this document, the financial data embedded in the one or more payment instruments 18a-b is transferred from the one or more payment instruments 18a-b to a storage medium of the computer processing system 16a and/or to a computer processing system 16n that may, in one non-exclusive example, be located in a wireless communications center 38 for use in conducting financial transactions across not only a wireless communications system 40, but also across a credit network 42, as illustrated in FIG. 1.

"Near-field communication" (NFC) systems have become known, and standards for NFC systems have been ratified. In accordance with the standards, NFC systems are limited to a range of only about 10 cm and are capable of a bit transfer rate of 424 kilobits per second using a carrier frequency of 13.56 MHz. Similar to radio frequency identification (RFID) systems, on which the new NFC standards are based, a principal function contemplated for NEC devices is the capacity to interrogate them in a passive mode in which they consume no power and to have a unique code, previously stored, rapidly and reliably returned in a manner which does not interfere with other wireless communications, and which minimizes or avoids interference from such other wireless communications whenever such an interrogation is made. NFC systems transmit information by inductive electromagnetic coupling in the radio frequency portion of the spectrum. The NFC standards also provide for software that enables nearly instantaneous peer-to-peer network setup. NFC devices thus effectively seek each other and establish a communication link between each other in contrast to, for example, Bluetooth enabled devices in which, while also intended for short range peer-to-peer communications, have setup procedures that are complex and extended, largely to establish device configuration which is unnecessary in NFC systems. This networking facility also is in contrast to RFID systems which are set up in a master/slave relationship in which usually passive chips or transponders are read by relatively expensive powered reader devices having a range of about two to five meters. NFC systems also differ from other types of known wireless communication systems such as so-called Wi-Fi systems that generally require an access hub. Further, NFC devices can be set to either an active or passive mode such that identification data can be sent even when the device is off and consuming no power. Even in an active mode, the range of NFC devices is so small that very little power is consumed. Accordingly, NFC devices have been implemented in single chips and chip sets for a wide variety of applications, and are appropriate for use in connection with the electronic payment system 10 described in this document.

As also illustrated in FIG. 1, the point-of-sale device 12 is operatively connectable, on demand, to the mobile wireless instrument 14. The point-of-sale device 12 is adapted to receive and process payment data. More specifically, the point-of-sale device is adapted to receive and process payment data across the credit network 42 to which the point-of-sale device 12 is operatively connectable.

Figure 3A:
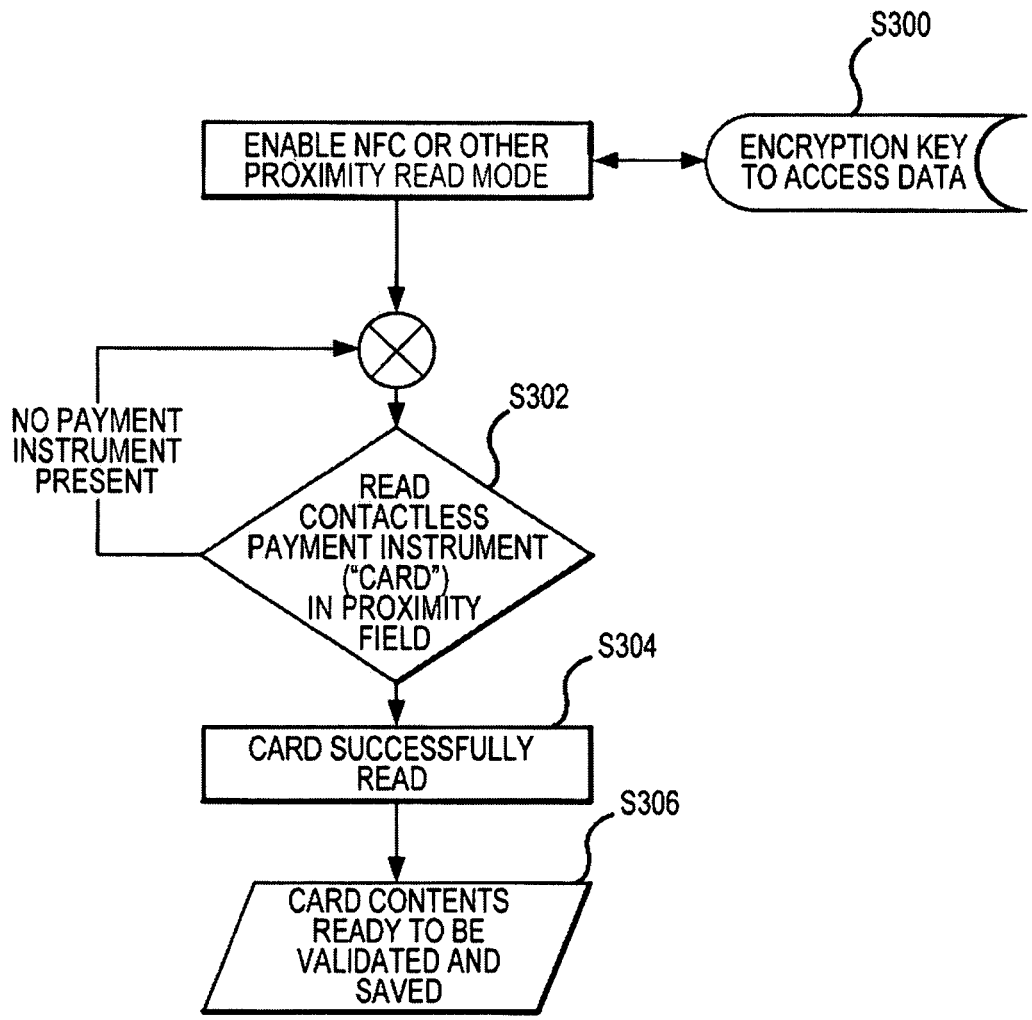
FIG. 3A is a flowchart illustrating one aspect of the method of use of the electronic payment system.
Figure 3B:
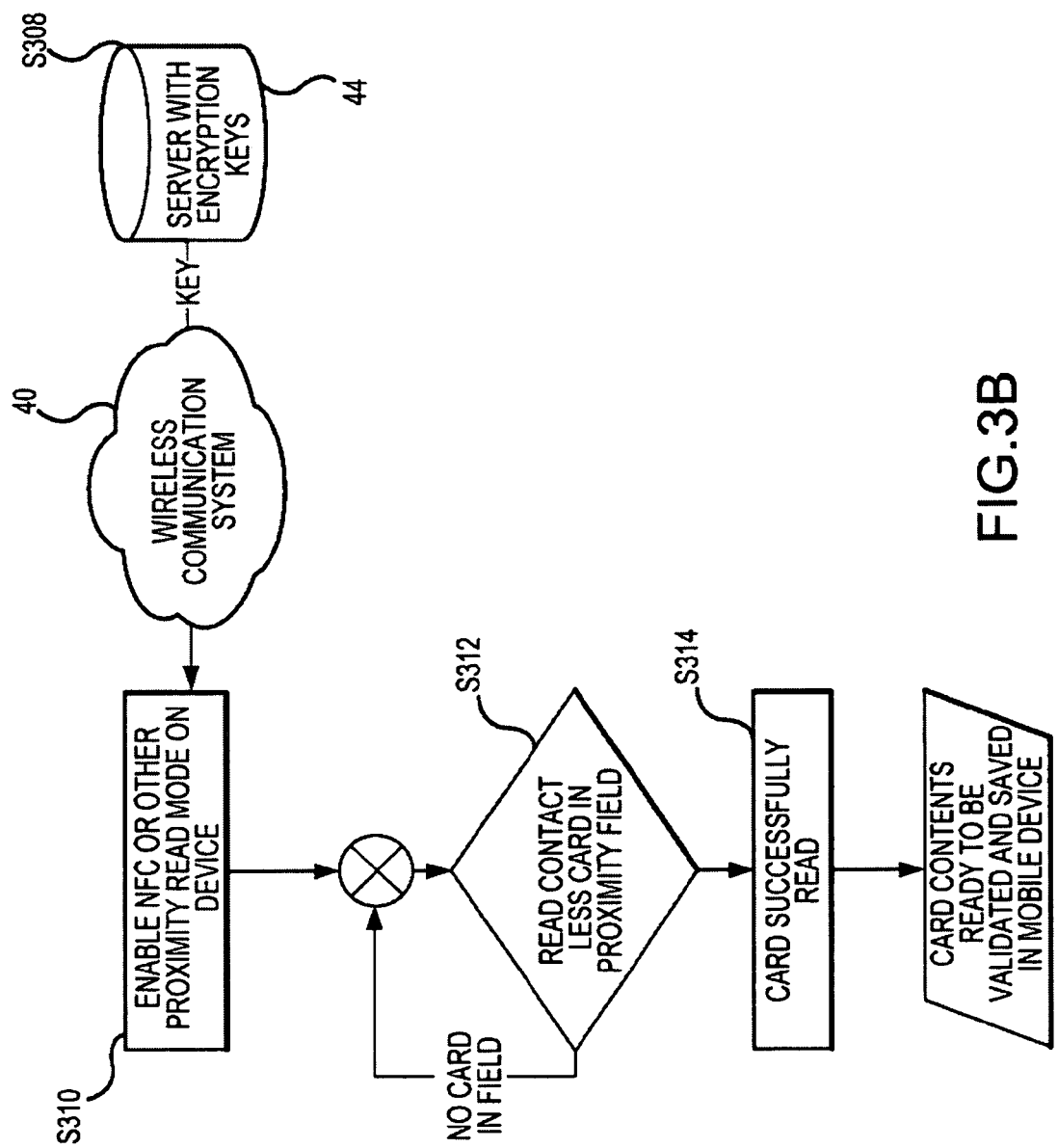
FIG. 3B is a flowchart illustrating another aspect of the method of use of the electronic payment system.

Aspects of methods of the electronic payment system 10 are summarized by flowcharts illustrated in FIGS. 3A-3B. The steps of the method are as follows. As previously indicated, an encryption key may be required to read a payment instrument. In one aspect of the electronic payment system, the encryption key may be stored in the data processor 20 of the mobile wireless instrument 14. However, for security reasons, the encryption key may be stored only temporarily on the mobile wireless instrument 14. Accordingly, in another aspect, the mobile wireless instrument 14 may obtain an encryption key from a remote server associated with the mobile wireless communications system 40 or the credit network 42, generally using over-the-air access. When a financial transaction has been completed, the mobile wireless instrument erases or discards the encryption key so as to enhance the security of the payment instrument 18 and of the financial transaction.

Accordingly, as shown in FIG. 3A, at step S300, the user uses an encryption key for reading the payment instrument 18. The encryption key is stored locally on the mobile wireless instrument 14. FIG. 3A illustrates a loop indicating that the mobile wireless instrument 14 reads or collects financial data from a payment instrument 18. At step S302, when the payment instrument 18 is brought into operational proximity, currently between one and ten centimeters, the financial data embedded in the payment instrument 18 may be collected (read) and stored in the data processor 20 of the mobile wireless instrument 14. At step S304, the mobile wireless instrument 14 has successfully read the payment instrument 18. Accordingly, at step S306 the financial data of the payment instrument 18 is prepared to be validated and stored.

Alternatively, as shown in FIG. 3B, the encryption key may be obtained from a remote server that is external to the mobile wireless instrument 14. Thus, as shown in FIG. 3B at step S308, the encryption key may be located or stored in a remote server 44. The encryption key may be transmitted across a wireless communication system 40 to the mobile wireless instrument 14, thus enabling the financial data to be read into and stored in the mobile wireless instrument 14. Once again, as shown in step S310, the mobile wireless instrument 14 is capable of reading the financial data from the payment instrument 18 when brought in operational proximity to one another. At step S312, the card has successfully been read, and at step S314 the card contents are ready to be validated and saved in the mobile wireless instrument.

Figure 4:
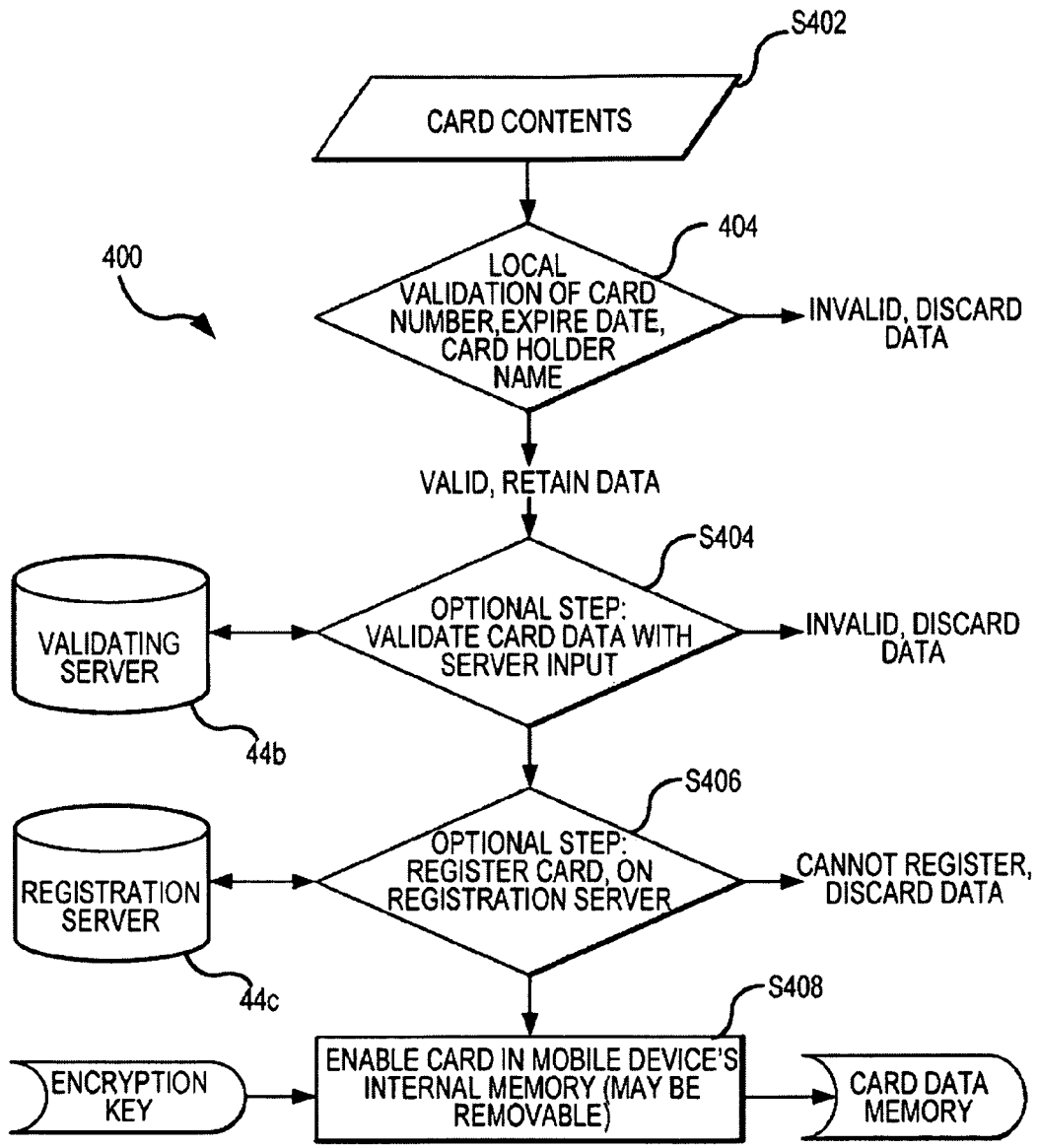
FIG. 4 is a flowchart illustrating yet another aspect of the method of use of the electronic payment system.

Another aspect of the electronic payment system 10 is illustrated by a flowchart 400 in FIG. 4. FIG. 4 illustrates steps after the mobile wireless instrument 14 has read and collected the financial data from the payment instrument 18. At step S402, the payment instrument 18, or card contents are successfully stored in the mobile wireless instrument 14. At step S404, a validation of the financial data is performed. The validation includes confirming one or more parameters of the financial data, such as the expiration date of the payment instrument, a comparison of the expiration date with the date of the proposed financial transaction to be conducted using the financial data, confirming the name of the person to whom the payment instrument has been issued with the name of the owner of the mobile wireless instrument, and/or verifying that the card number assigned to the payment instrument continues to be valid. After validation, as shown in FIG. 4 at step S404, a first optional further validation of financial data associated with the payment instrument 18 is possible by using a server 44b external to the mobile wireless instrument 14, as emphasized at step S404. The advantage of this option might be to check against a register of stolen payment instruments or other resource for confirming the absence of fraud. A second optional step S406 is then to register the financial data on a server 44c in case the mobile wireless instrument is lost or stolen. Registration data may be used to disable the financial data from the payment instrument 18 that is stored on the mobile wireless instrument 14. Alternatively, the validation server 44c and the registration server 44c could be a single server. As shown at step S408, the financial data of the payment instrument 18 is stored in the mobile wireless instrument 14, and enables the mobile wireless instrument 14, in the absence of the payment instrument 18, to conduct a financial transaction across a credit network 42 using a point-of-sale device 12.

Claim elements and steps in this document have been numbered solely as an aid in understanding the description. The numbering is not intended to, and should not be considered as intending to, indicate the ordering of elements and steps in the claims. In addition, the electronic payment system shown in drawing FIGS. 1 through 4 shows at least one aspect of the payment system that is not intended to be exclusive, but merely illustrative of the disclosed embodiments. Method steps may be interchanged sequentially without departing from the scope of the payment system. In addition, means-plus-function clauses in the claims are intended to cover the structures described as performing the recited function that include not only structural equivalents, but also equivalent structures. Likewise, although the system, apparatus and methods provide for use with NFC devises and technologies, that is not a limitation of future uses of the NFC-enabled payment system, but only recognition of the current ubiquitous nature of NFC technology for making electronic payments, which may, however, change over time.

What is claimed is:

1. A computer-implemented method of conducting a financial transaction across a near-field communications enabled (NFC-enabled) point-of-sale device, the method comprising:

detecting a first positioning of a mobile wireless instrument in operational proximity of an NFC-enabled payment instrument;

establishing a first short-range peer-to-peer communications link between the mobile wireless instrument and the NFC-enabled payment instrument in response to detecting the first positioning;

receiving in the mobile wireless instrument encrypted NFC-enabled financial data from the NFC-enabled payment instrument over the first short-range peer-to-peer communications link;

storing the encrypted NFC-enabled financial data in at least one of one or more non-transitory storage mediums of the mobile wireless instrument;

receiving in the mobile wireless instrument a temporary transactional encryption key from a server;

decrypting the NFC-enabled financial data in the mobile wireless instrument by applying the received temporary transactional encryption key to the encrypted NFC-enabled financial data;

storing the decrypted NFC-enabled financial data in at least one of the one or more non-transitory storage mediums of the mobile wireless instrument;

detecting a second positioning of the mobile wireless instrument in operational proximity of the NFC-enabled point-of-sale device;

establishing a second short-range peer-to-peer communications link between the mobile wireless instrument and the NFC-enabled point-of-sale device; and sending an instruction from the mobile wireless instrument to the NFC-enabled point-of-sale device over the second short-range peer-to-peer communications link to authorize the financial transaction.

2. The computer-implemented method of claim 1, wherein receiving in the mobile wireless instrument encrypted NFC-enabled financial data from the payment instrument over the first short-range peer-to-peer communications link comprises receiving encrypted NFC-enabled financial data comprising:

the name of a primary account holder;
the primary account number associated with the primary account holder;
a country code;
an expiration date; and
a personal identification number.

3. The computer-implemented method of claim 1, further comprising:

erasing the temporary transactional encryption key after the financial transaction has been completed.

4. The computer-implemented method of claim 1, wherein the mobile wireless instrument comprises a cellular telephone.

5. The computer-implemented method of claim 1, further comprising:

validating the decrypted NFC-enabled financial data.

6. The computer-implemented method of claim 1, wherein sending an instruction from the mobile wireless instrument to the NFC-enabled point-of-sale device to authorize the financial transaction comprises receiving an authorization across a mobile wireless communications system.

7. A mobile payment device, comprising:

means for detecting a first positioning of the mobile payment device in operational proximity of an NFC-enabled payment instrument;

means for establishing a first short-range peer-to-peer communications link with the NFC-enabled payment instrument in response to detecting the first positioning;

means for receiving encrypted NFC-enabled financial data from the NFC-enabled payment instrument over the first short-range peer-to-peer communications link;

means for storing the encrypted NFC-enabled financial data in at least one of one or more memories;

means for receiving a temporary transactional encryption key from a server;

means for decrypting the NFC-enabled financial data by applying the received temporary transactional encryption key to the encrypted NFC-enabled financial data;

means for storing the decrypted NFC-enabled financial data in at least one of the one or more memories;

means for detecting a second positioning of the mobile payment device in operational proximity of an NFC-enabled point-of-sale device;

means for establishing a second short-range peer-to-peer communications link with the NFC-enabled point-of-sale device in response to detecting the second positioning; and means for sending an instruction to the NFC-enabled point-of-sale device over the second short-range peer-to-peer communications link to authorize a payment transaction.

8. The mobile payment device as recited in claim 7, further comprising means for erasing the temporary transactional encryption key after the payment transaction has been completed.

9. A non-transitory storage medium having stored thereon processor-executable software instructions configured to cause a processor of a mobile wireless instrument to perform operations for conducting a financial transaction across a credit network, the operations comprising:

detecting a positioning of the mobile wireless instrument within operational proximity of an NFC-enabled payment instrument;

establishing a first short-range peer-to-peer communications link between the mobile wireless instrument and the NFC-enabled payment instrument in response to detecting the first positioning;

receiving at the mobile wireless instrument encrypted NFC-enabled financial data from the NFC-enabled payment instrument over the first short-range peer-to-peer communications link;

storing the encrypted NFC-enabled financial data in at least one of one or more memories;

receiving a temporary transactional encryption key from a server;

decrypting the NFC-enabled financial data with the temporary transactional encryption key;

storing the decrypted NFC-enabled financial data in at least one of the one or more memories of the mobile wireless instrument;

detecting a second positioning of the mobile wireless instrument within operational proximity of an NFC-enabled point-of-sale device;

establishing a second short-range peer-to-peer communications link between the mobile wireless instrument and the NFC-enabled point-of-sale device in response to detecting the second positioning; and sending an instruction to the NFC-enabled point-of-sale device over the second short-range peer-to-peer communications link to authorize a payment transaction from the mobile wireless instrument.

10. The non-transitory storage medium of claim 9, wherein the stored processor-executable software instructions are configured to cause a processor of a mobile wireless instrument to perform operations such that storing encrypted NFC-enabled financial data comprises storing encrypted NFC-enabled financial data in a memory of the mobile wireless instrument.

11. The non-transitory storage medium of claim 9, wherein the stored processor-executable software instructions are configured to cause a processor of a mobile wireless instrument to perform operations further comprising receiving an authorization over a credit network.

12. The non-transitory storage medium of claim 9, wherein the stored processor-executable software instructions are configured to cause a processor of a mobile wireless instrument to perform operations further comprising erasing the temporary transactional encryption key after the financial transaction is completed.

13. A mobile payment device, comprising:
   one or more memory devices;
   one or more processors coupled with the one or more memory devices, the one or more processors and the one or more memory devices being configured to:
   detect a first positioning of the mobile payment device in operational proximity of an NFC-enabled payment instrument;
   establish a first short-range peer-to-peer communications link with the NFC-enabled payment instrument in response to detecting the first positioning;
   receive encrypted NFC-enabled financial data from the NFC-enabled payment instrument over the first short-range peer-to-peer communications link;
   store the encrypted NFC-enabled financial data in at least one of the one or more memory devices;
   receive a temporary transactional encryption key from a server;
   decrypt the NFC-enabled financial data by applying the received temporary transactional encryption key to the encrypted NFC-enabled financial data;
   store the decrypted NFC-enabled financial data in at least one of the one or more memory devices;
   detect a second positioning of the mobile payment device in operational proximity of an NFC-enabled point-of-sale device;
   establish a second short-range peer-to-peer communications link with the NFC-enabled point-of-sale device in response to detecting the second positioning; and
   send an instruction to the NFC-enabled point-of-sale device over the second short-range peer-to-peer communications link to authorize a payment transaction.

\* \* \* \* \*